United States Patent
Jeffs et al.

(10) Patent No.: US 10,655,335 B2
(45) Date of Patent: May 19, 2020

(54) SYSTEM AND METHOD OF ASSEMBLING AND INSTALLING COMMERCIAL ROOFING

(71) Applicants: Brig Jeffs, New Harmony, UT (US); Edson Harker, Hurricane, UT (US); James Barlow, Colorado City, AZ (US); James Harker, Colorado City, UT (US); Nathan Jessop, Hildale, UT (US); Sam Williams, Colorado City, AZ (US); Thomas Harker, Hurricane, UT (US)

(72) Inventors: Brig Jeffs, New Harmony, UT (US); Edson Harker, Hurricane, UT (US); James Barlow, Colorado City, AZ (US); James Harker, Colorado City, UT (US); Nathan Jessop, Hildale, UT (US); Sam Williams, Colorado City, AZ (US); Thomas Harker, Hurricane, UT (US)

(73) Assignee: Innovatech, LLC, Kanarraville, UT (US)

( * ) Notice: Subject to any disclaimer, the term of this patent is extended or adjusted under 35 U.S.C. 154(b) by 130 days.

(21) Appl. No.: 15/813,117

(22) Filed: Nov. 14, 2017

(65) Prior Publication Data
US 2018/0135306 A1    May 17, 2018

Related U.S. Application Data

(60) Provisional application No. 62/421,448, filed on Nov. 14, 2016, provisional application No. 62/550,855, filed on Aug. 28, 2017.

(51) Int. Cl.
*E04D 15/00*    (2006.01)
*E04D 15/04*    (2006.01)
(Continued)

(52) U.S. Cl.
CPC .............. *E04D 15/04* (2013.01); *B60L 50/50* (2019.02); *B60R 11/06* (2013.01); *B62D 21/18* (2013.01);
(Continued)

(58) Field of Classification Search
CPC ... E04D 15/04; E04D 15/00; E04D 2015/042; B60L 50/50; B60L 2200/40; B62D 21/18; B60R 11/06; B60Y 2200/49
See application file for complete search history.

(56) References Cited

U.S. PATENT DOCUMENTS 3,805,978 A * 4/1974 Hahne ...................... B66C 1/06
                                                          414/797.1
4,507,901 A * 4/1985 Carroll ..................... E04B 7/00
                                                           52/220.1
(Continued)

*Primary Examiner* — Rick K Chang
(74) *Attorney, Agent, or Firm* — Gurr Brande & Spendlove; Robert A. Gurr

(57) ABSTRACT

A system for assembling roofing at ground level has an adjustable-length center frame separating a first assembly side from a second assembly side; a first cantilevered gantry on the first assembly side and a second cantilevered gantry on a second side, each cantilevered gantry moveable along the length of the center frame; a plurality of outrigger beams coupled to opposing ends of the center beam, each outrigger beam having a catwalk thereon; a first joist railing and a second joist railing on each assembly side, each joist railing configured to receive an end of an open web joist; and a base frame comprising a plurality of wheels. Once the roofing section has been assembled, hoisting the assembled roofing section to the top of a structure.

2 Claims, 11 Drawing Sheets

(51) Int. Cl.
*B60L 50/50* (2019.01)
*B60R 11/06* (2006.01)
*B62D 21/18* (2006.01)

(52) U.S. Cl.
CPC .......... *E04D 15/00* (2013.01); *B60L 2200/40* (2013.01); *B60Y 2200/49* (2013.01); *E04D 2015/042* (2013.01)

(56) References Cited

U.S. PATENT DOCUMENTS

| | | | | |
|---|---|---|---|---|
| 4,525,967 A * | 7/1985 | Simpson | ................ | F16B 35/06 |
| | | | | 52/404.2 |
| 4,833,841 A * | 5/1989 | Ellington, III | ........ | E04B 1/3483 |
| | | | | 52/143 |
| 5,380,123 A * | 1/1995 | Ryynanen | ................ | E01C 3/00 |
| | | | | 14/24 |
| 6,216,416 B1 * | 4/2001 | West | ................ | E04D 15/04 |
| | | | | 414/11 |
| 7,574,839 B1 * | 8/2009 | Simpson | ................ | E04D 3/362 |
| | | | | 52/520 |
| 7,841,148 B2 * | 11/2010 | Tonyan | ................ | B28B 1/522 |
| | | | | 106/735 |
| 8,529,178 B2 * | 9/2013 | Dayton | ................ | E04B 1/24 |
| | | | | 411/386 |
| 8,607,523 B2 * | 12/2013 | Lee | ................ | E04C 2/384 |
| | | | | 52/656.1 |
| 9,004,835 B2 * | 4/2015 | Dayton | ................ | E04B 1/1903 |
| | | | | 411/386 |
| 9,546,495 B2 * | 1/2017 | Shiomi | ................ | E04H 7/065 |
| 9,631,379 B2 * | 4/2017 | Koot | ................ | E04B 1/3527 |
| 9,637,361 B2 * | 5/2017 | Long | ................ | E04G 23/065 |

* cited by examiner

SYSTEM AND METHOD OF ASSEMBLING AND INSTALLING COMMERCIAL ROOFING

CROSS-REFERENCE TO RELATED APPLICATIONS

This application claims the benefit of U.S. Provisional Application Ser. No. 62/421,448 filed on Nov. 14, 2016 and U.S. Provisional Application Ser. No. 62/550,855, filed on Aug. 28, 2017, both of which are incorporated herein by reference.

TECHNICAL FIELD

The present disclosure relates to commercial construction. More particularly, the present disclosure relates to a system and method of assembling roofing components at ground level and installing the assembled roofing components on a structure.

BACKGROUND

Building construction is an inherently dangerous activity. Heavy materials, large equipment, and heights all create added risk. This is particularly true for the roofing industry. When installing roofing, it is not uncommon to have many workers on the roof level, where they are interacting with dangerous components at dangerous heights. The more workers on the roof, the higher the odds of an accident. In an effort to reduce these risks, safety measures have been implemented for those workers on the roof, such as safety harnesses. However, while the risk is lowered by using safety harnesses and equipment, accidents still occur. Further, such safety measures slow the process of roof installation, as each construction worker on the roof must ensure that the appropriate safety measures are completed. This may include releasing a first strap while relocating to the next position, then securing a second strap. If only one strap is used, the user risks falling when relocating to a new position on the roof. Both of these measures take time and thereby reduce efficiency. Further, equipment must be hoisted to those workers on the roof. Cranes or other devices lift such materials, where they interact dangerously with the men on the roof. Accordingly, to assemble a typical commercial roof, several workers are needed at roof height to help position open web joists, place sheathing, perform welding, etc. In other words, in order to work quickly, a greater number of workers is needed on the roof. However, as stated earlier, the more workers on the roof, the higher the odds of an accident.

Therefore, there remains a need for a system whereby the risks of roof installation are reduced, while the efficiency of assembling and installing the roof increases. The present invention seeks to solve these and other problems.

SUMMARY OF EXAMPLE EMBODIMENTS

A system for assembling roofing comprises an adjustable-length center frame separating a first assembly side from a second assembly side; a first cantilevered gantry on the first assembly side and a second cantilevered gantry on a second side, each cantilevered gantry moveable along the length of the center frame; a plurality of outrigger beams coupled to opposing ends of the center beam, each outrigger beam having a catwalk thereon; a first joist railing and a second joist railing on each assembly side, each joist railing configured to receive an end of an open web joist; and a base frame comprising a plurality of wheels.

A method of assembling roofing using a system for assembling roofing comprises placing a plurality of open web joists between the first joist railing and second joist railing of the first assembly side; placing a plurality of open web joists between the first joist railing and second joist railing of the second assembly side; mounting and welding the purlins of the open web joists; placing a bunk of corrugated steel sheathing on the first cantilevered gantry; moving the first cantilevered gantry along the length of the center frame; removing sheets of corrugated steel sheathing from the first cantilevered gantry as it travels on the center frame; securing the corrugated steel sheathing to the open web joists, forming an assembled roofing section; hoisting the assembled roofing section to the top of a structure for securing thereto.

DETAILED DESCRIPTION OF EXAMPLE EMBODIMENTS

Figure 1:
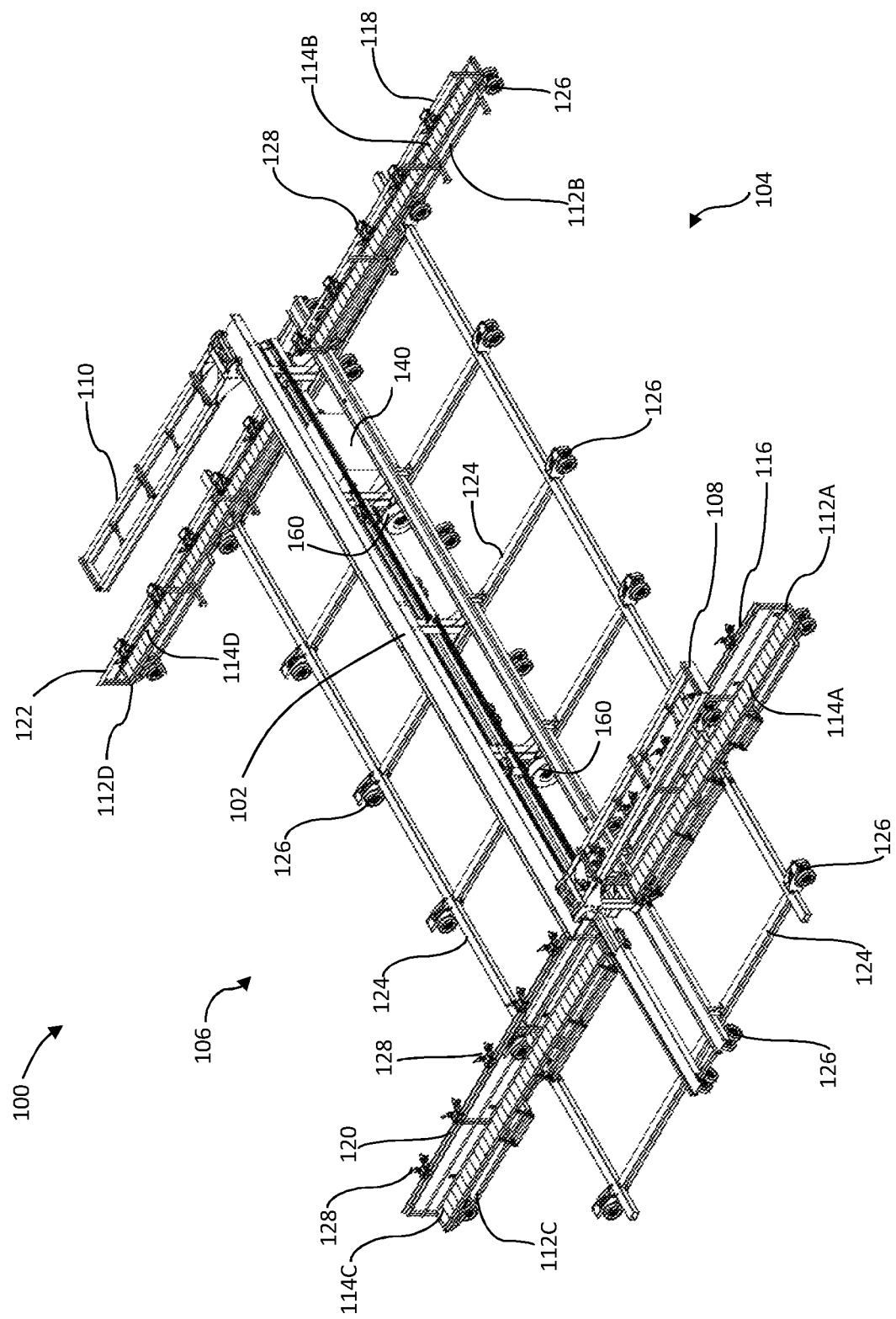
FIG. 1 is a perspective view of a system for assembling roofing.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As will be appreciated from this disclosure, the present system and method for assembling a commercial roof significantly reduces risk to workers by allowing the majority of workers to remain at ground level. In other words, the roof is assembled in sections at the ground level, allowing most workers to remain at ground level as part of the assembly team. Only two workers are required to be on the roof for final placement of the assembled roofing sections, which significantly reduces the odds of someone falling. Further, because the roof is assembled at ground level, workers are able to work more efficiently. In other words, workers at ground level do not need to concern themselves with being secured to the structure and working under such constraints. As such, workers are able to move around more freely and quickly, allowing for faster assembly of roof sections.

Figure 2:
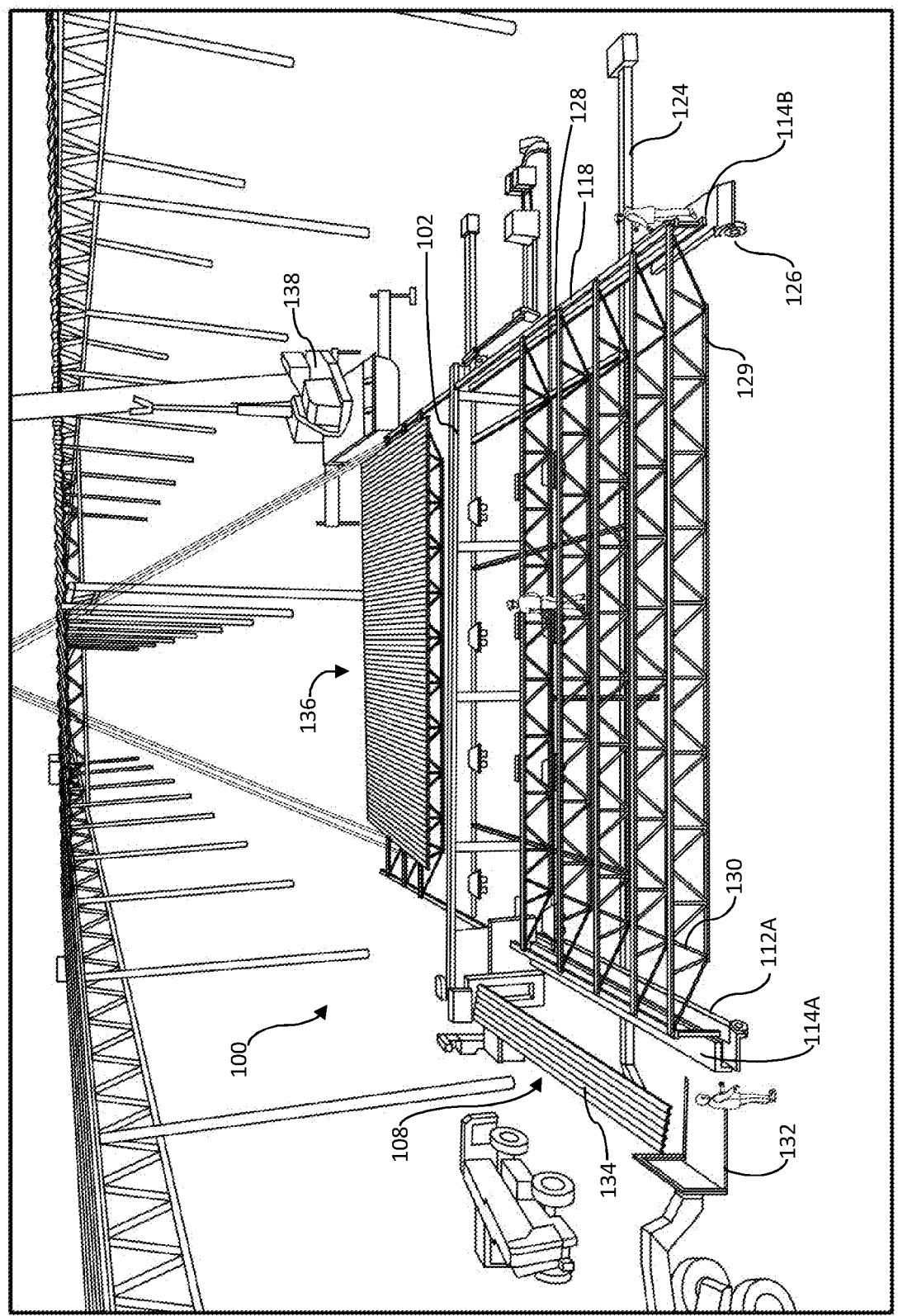
FIG. 2 is a perspective view of a system for assembling roofing.

In one embodiment, as shown in FIGS. 1-4, a system for assembling roofing 100 comprises a center frame 102 separating a first assembly side 104 from a second assembly side 106; a first cantilevered gantry 108 on the first assembly side 104 and a second cantilevered gantry 110 on a second assembly side 106, each cantilevered gantry 108, 110 moveable along the length of the center frame 110; a plurality of outrigger beams 112A-112D coupled to opposing ends of the center beam 102, each outrigger beam 112A-112D having a catwalk 114A-114D thereon; a first joist railing 116 and a second joist railing 118 on a first assembly side 104 and a first joist railing 120 and a second joist railing 122 on a second assembly side 106, each joist railing 116, 118, 120, 122 configured to receive an end of an open web joist 129 (as best shown in FIG. 2); and base frame members 124 comprising a plurality of wheels (or casters) 126. Each joist railing 116, 118, 120, 122 comprises joist receiving brackets 128. The brackets may be placed at a plurality of positions along the joist railings 116, 118, 120, 122 so as to comply with the relevant blueprint requirements for joist spacing. Therefore, in one example of use, the workers would place a plurality of open web joists 129 between joist railings 116 and 118, with each end of the open web joist 129 being received in receiving brackets 128. This is easily accomplished by having a worker on each catwalk 114A, 114B guiding the joist 129 into the receiving brackets 128 as a joist is hoisted into place. The same process is repeated on the second assembly side 106. It will be appreciated that the center frame 102 may be adjusted in length (either telescopically, by adding additional segments, or similar extending means, or simply using a longer center frame) so that joists of varying lengths, according to the job at hand, may be used. It will be appreciated that while open web joists 129 are used as examples throughout this disclosure, the invention is not so limited, and other joists and roofing structures may be used.

Figure 3:
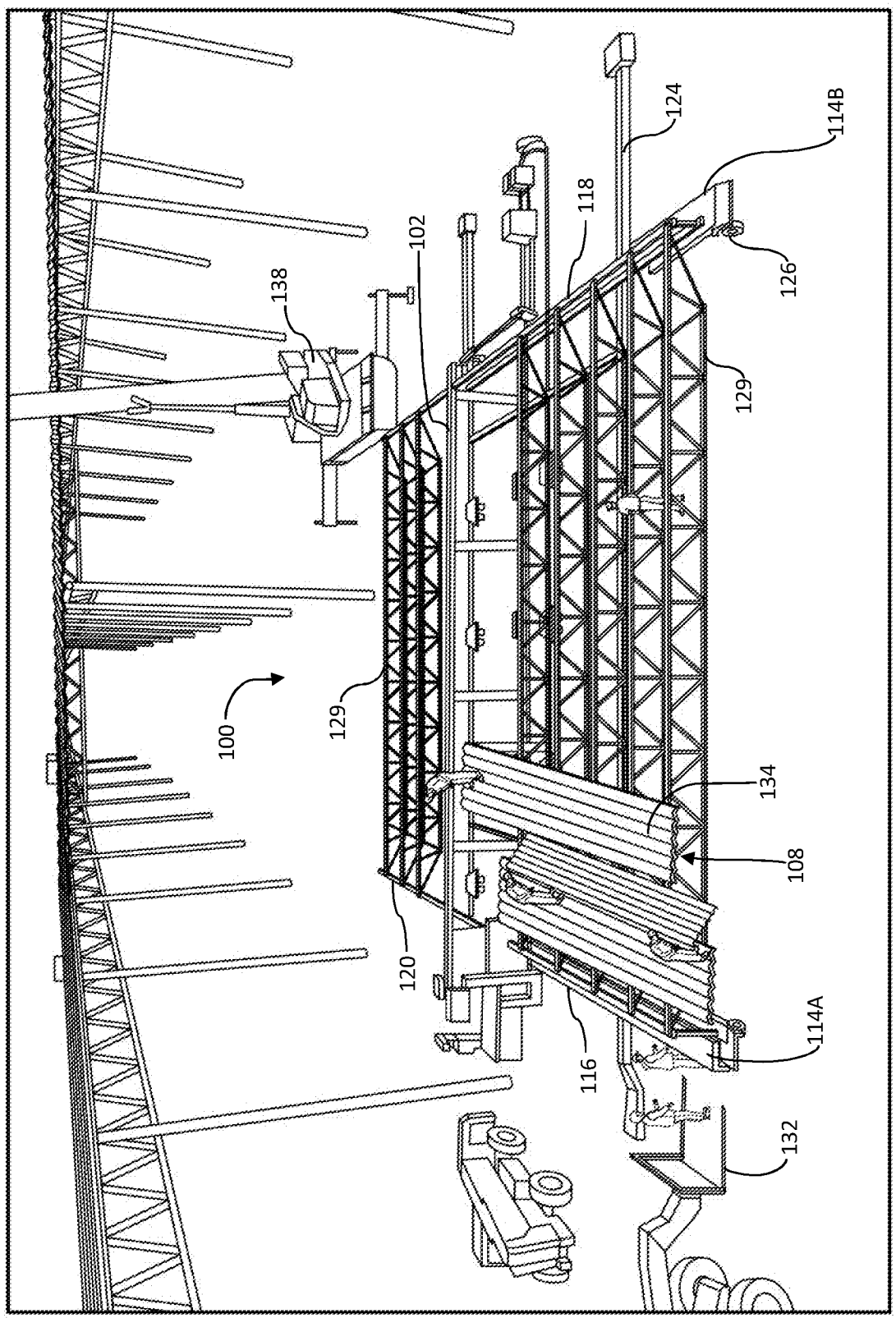
FIG. 3 is a perspective view of a system for assembling roofing.
Figure 4:
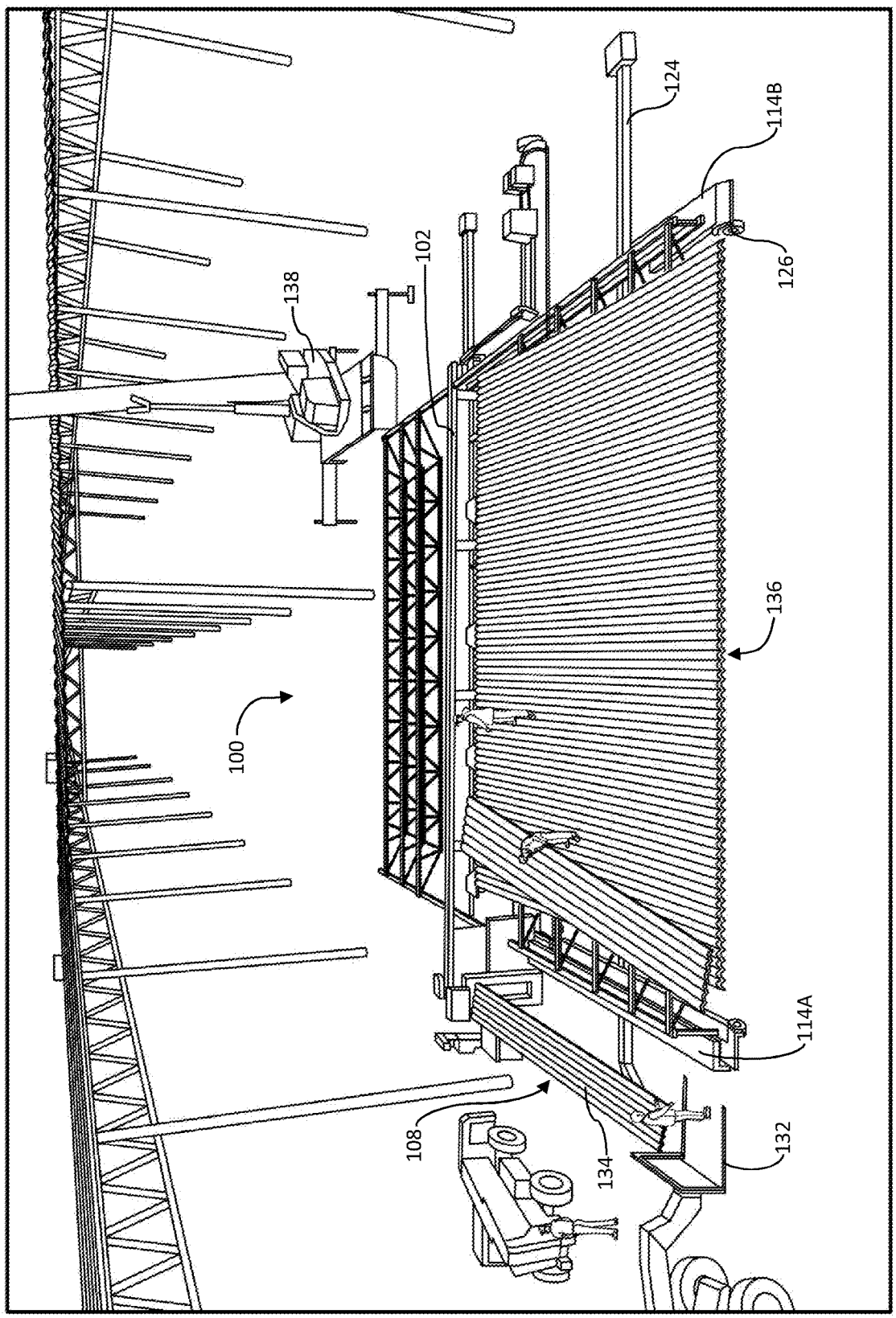
FIG. 4 is a perspective view of a system for assembling roofing.
Figure 5:
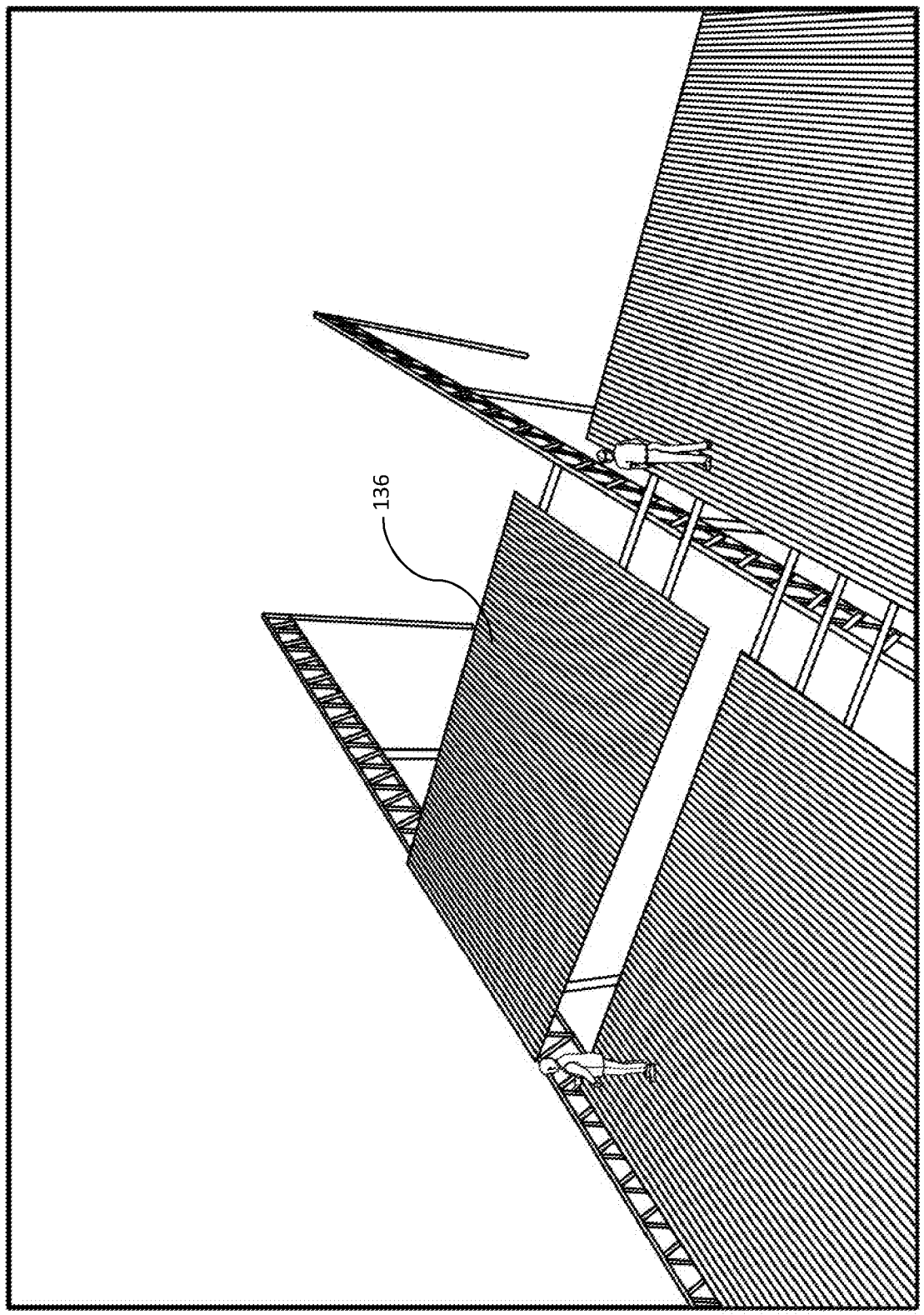
FIG. 5 is a perspective view of an assembled roofing section being placed on a roof.

As shown in FIG. 2, with the joists 129 placed in the receiving brackets 128, the purlins 130 may be easily mounted and welded. In this example, a fully assembled roofing section 136 is being hoisted by a crane to be placed on a roof, while the workers are assembling a second roofing section on the other assembly side. A forklift 132 or other machinery may hoist a bunk of corrugated steel sheathing 134 onto the first cantilevered gantry 108. The first sheets of corrugated sheathing 134 may then be placed on top of the joists 129, with the workers moving the first cantilevered gantry 108 as each sheet of corrugated sheathing 134 is placed. The first cantilevered gantry 108 may be moved manually, such as by a user pushing it, or using a motor or other linear actuator (e.g., hydraulics, motor-driven screw drives, etc.). As shown in FIGS. 3-4, as the first cantilevered gantry 108 moves along the center frame 102 to the second end of the center frame 102, all of the corrugated sheathing 134 is placed on the joists 129. The corrugated sheathing 134 may then be secured to the joists 129. With the joists 129 welded together with purlins 130 and the sheathing 134 secured to the top of the joists 129, the assembled roofing section is complete and ready for hoisting. FIG. 2 illustrates an assembled roofing section 136 being hoisted by a crane 138 to the top of a structure. FIG. 5 illustrates the assembled roofing section 136 being positioned on the roof so that it may be secured thereto. While not shown, a crane is typically supporting the assembled roofing section while workers position it accordingly. Therefore, as will be understood, most of the roofing workers remain on the ground level, using the system to construct assembled roofing sections. Accordingly, as few as two workers are needed on a rooftop for positioning and securing the assembled roofing section. These are major advantages over the prior art. Further, because the system comprises two roof assembly sides 104, 106 that are mirror images of each other, two assembled roofing sections may be constructed simultaneously, allowing for fast and efficient construction of the roof. For example, FIG. 4 illustrates that while one assembled roofing section is near completion, joists 129 are being placed on a second assembly side to build it simultaneously.

Figure 6:
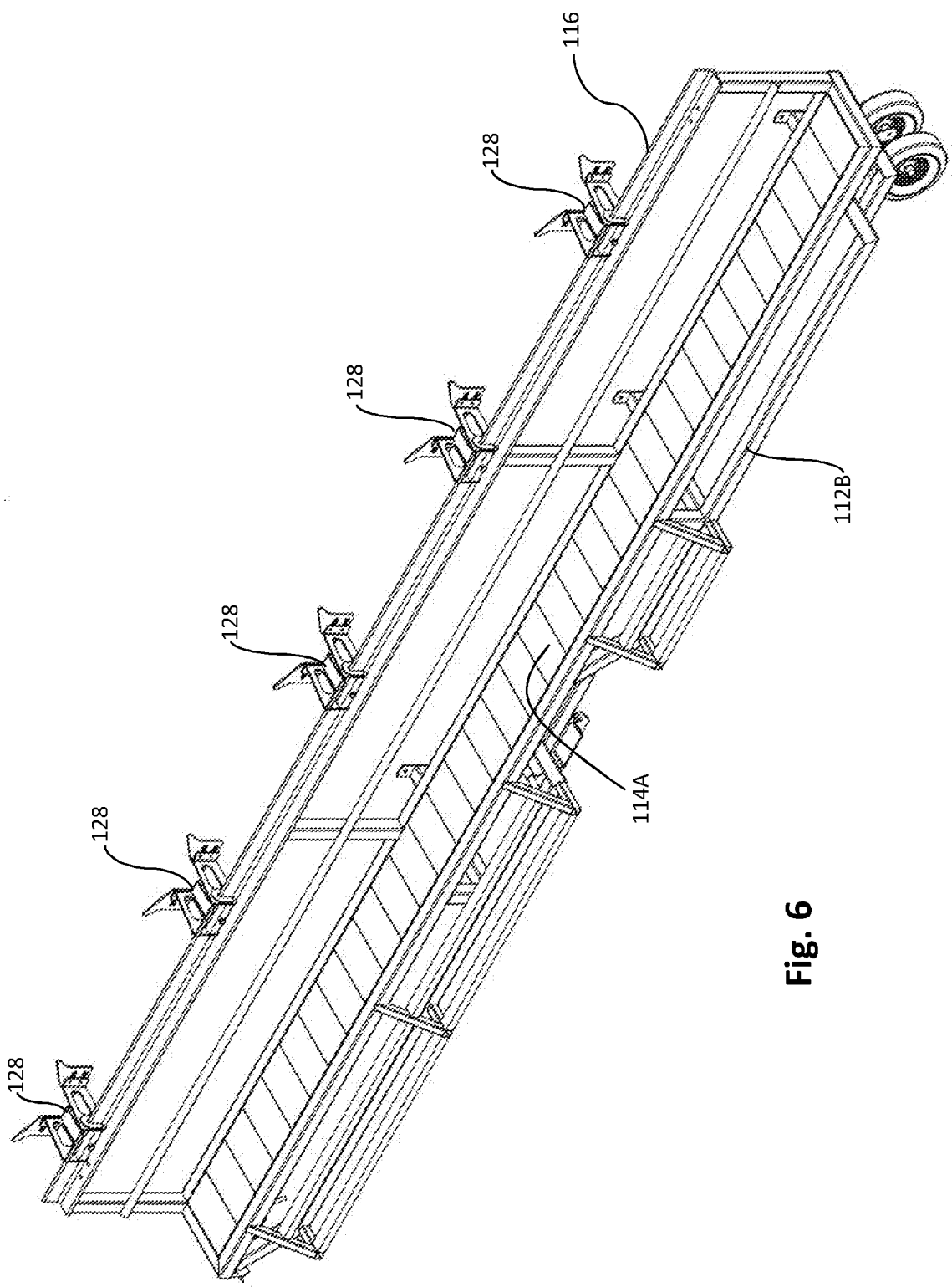
FIG. 6 is a perspective view of an outrigger beam of a system for assembling roofing.

FIG. 6 illustrates a detailed view of an outrigger beam 112B. The joist receiving brackets 128 are positionable on first joist railing 116, such as by using bolts to secure the receiving brackets 128 to the railing 116. The platform 114A provides a stable and secure environment for a worker to walk while placing and securing the receiving brackets 128 and the joists 129 (not viewable in this Fig.) in the brackets 128.

Figure 7:
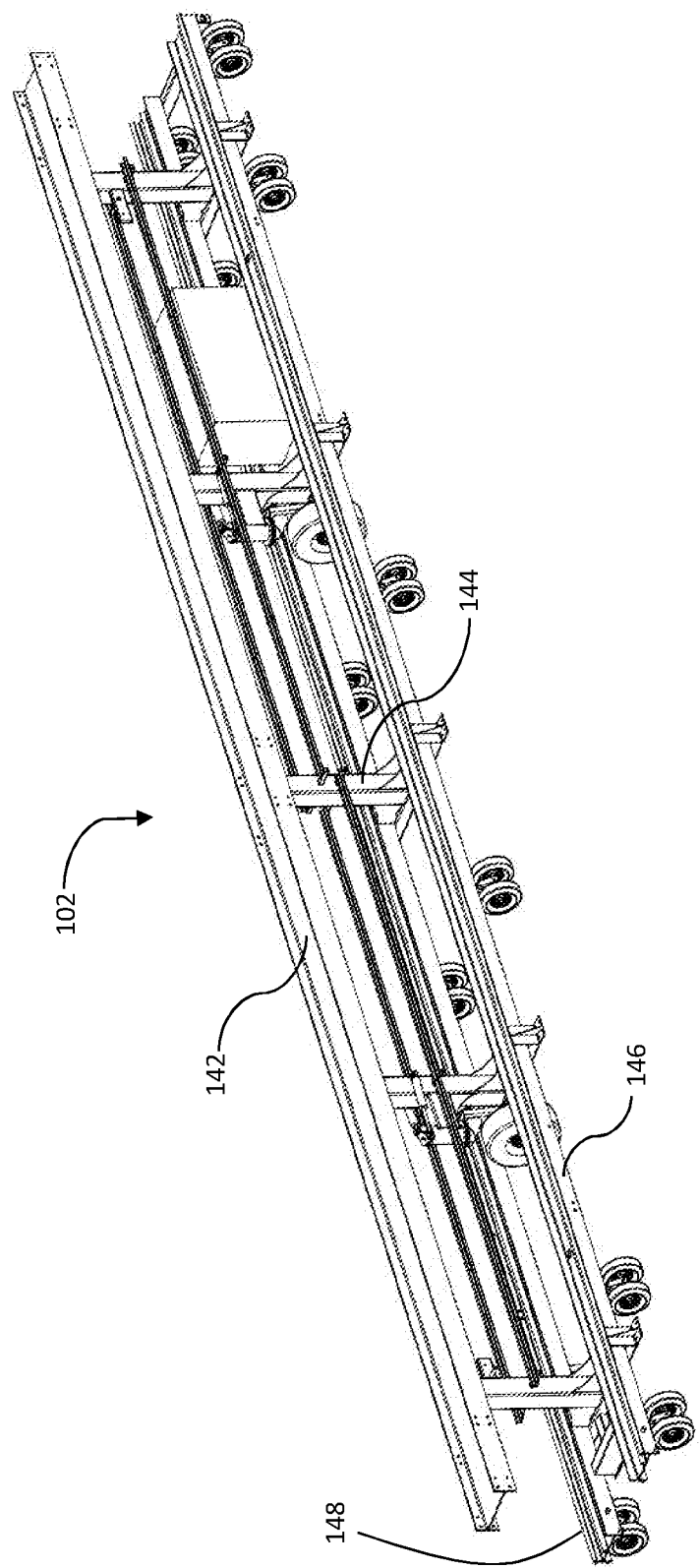
FIG. 7 is a perspective view of a center frame of a system for assembling roofing.

FIG. 7 illustrates a detailed view of the center frame 102. As shown, the frame comprises an upper beam 142 on support legs 144, with lower beams 146, 148 for coupling to additional framing members as well as outrigger beams (neither of which are visible in this Fig.). A generator 140 may be mounted thereon to aid in welding and/or moving the system. In one embodiment, a system for assembling roofing comprises a generator 140 which has electrical leads powering a welder feeder mounted to a rotating post. The rotating post has an articulating arm which carries the welder feeder whip and welder gun. This allows a user to navigate both assembly sides 104, 106 easily so as to perform required welding (e.g., purlins).

Figure 8:
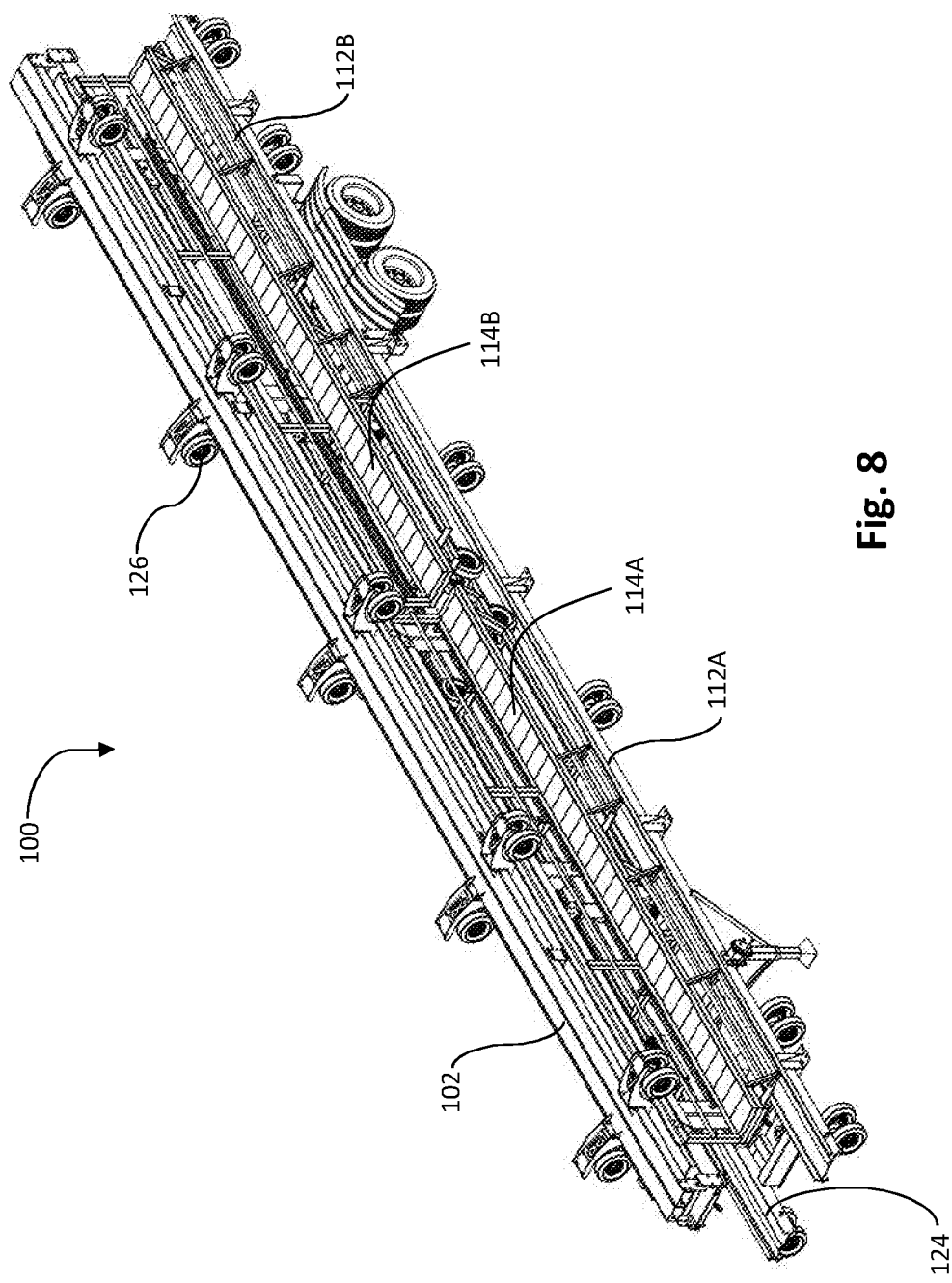
FIG. 8 is a perspective view of a system for assembling roofing stacked for transportation.
Figure 9:
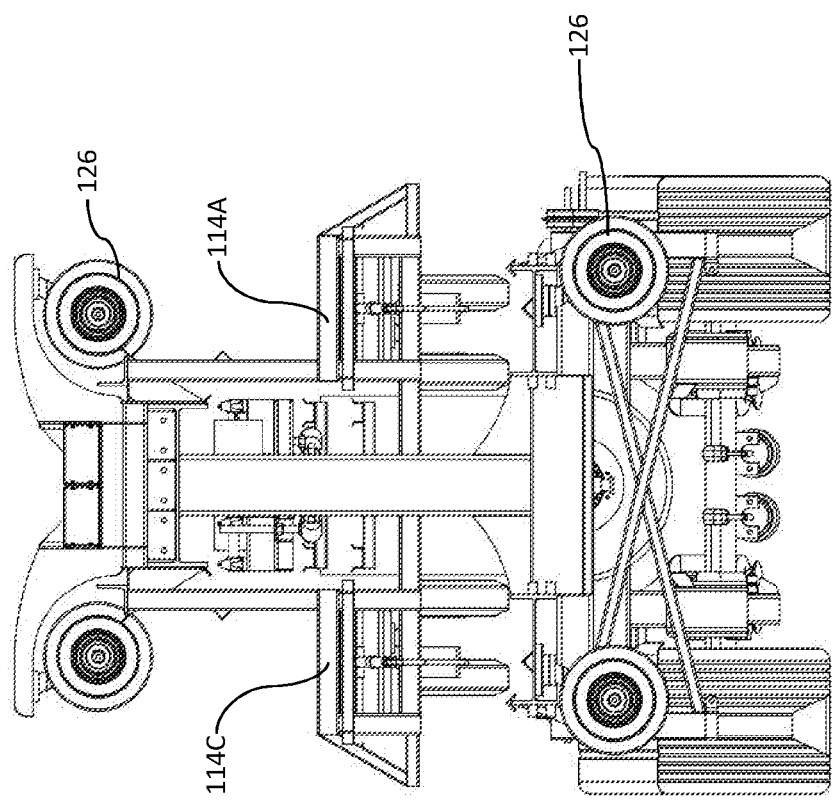
FIG. 9 is a perspective view of a system for assembling roofing stacked for transportation.
Figure 11:
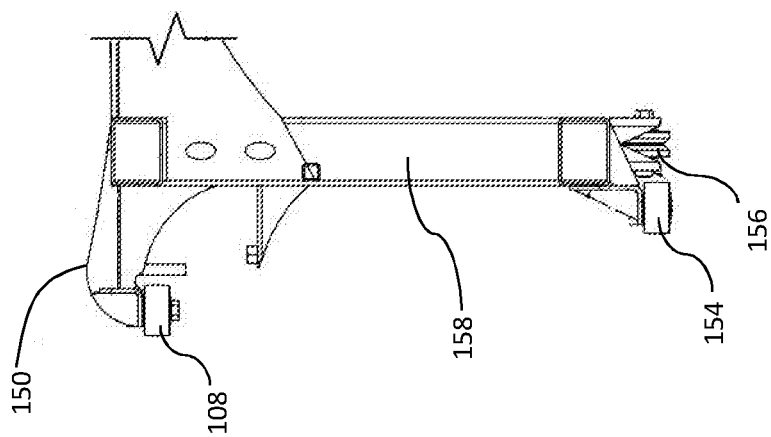
FIG. 11 is a side detailed view of a cantilevered gantry of a system for assembling roofing.

FIGS. 8-9 illustrate how the system for assembling roofing 100 is stackable so as to be easily transported. Accordingly, the entire system may be transported on standard roads without oversize equipment.

Figure 10:
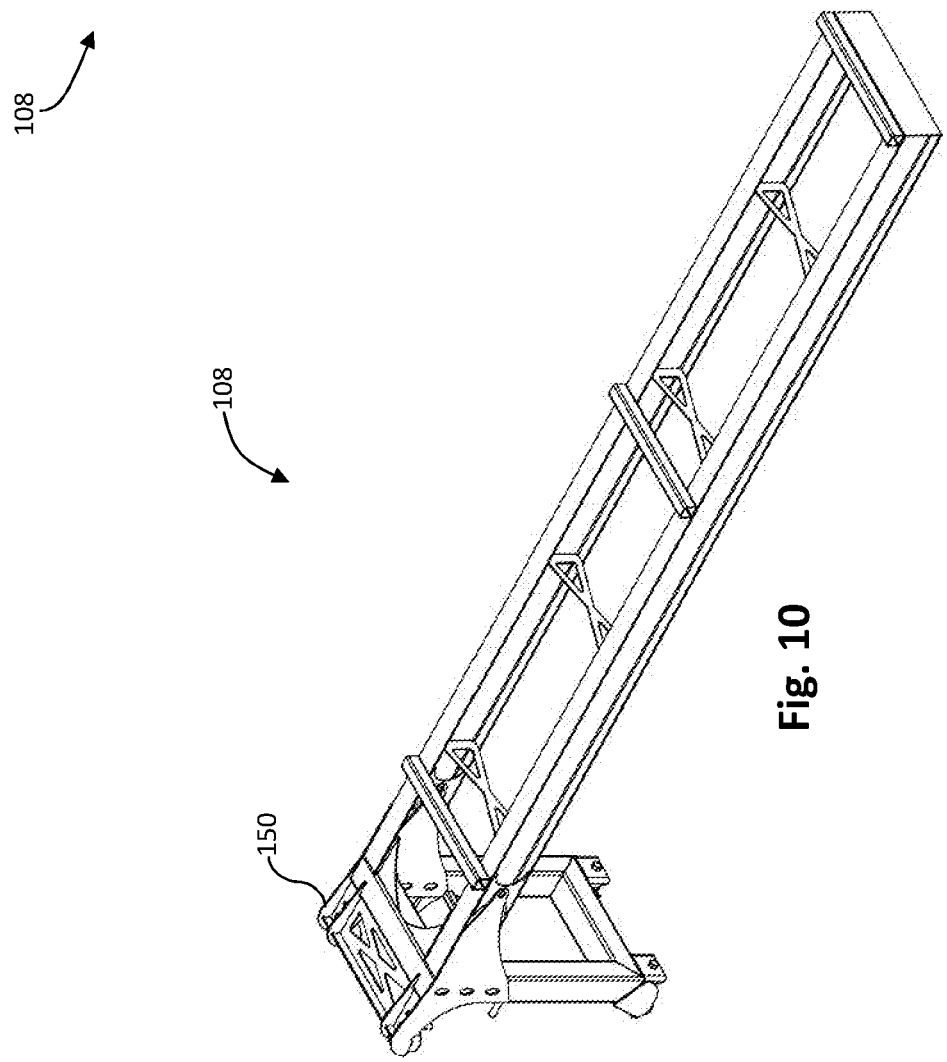
FIG. 10 is a perspective view of a cantilevered gantry of a system for assembling roofing.

FIG. 10 is a detailed view of a cantilevered gantry 108. A support gusset 150 rests on, and engages, via upper wheels 152, the upper beam 142 of the center frame 102. Lower wheels 154 and roller bushings 156 at the bottom of gantry support 158 engage the lower beams 146, allowing the cantilevered gantry 108 to easily slide on the center frame 102.

Figure 12:
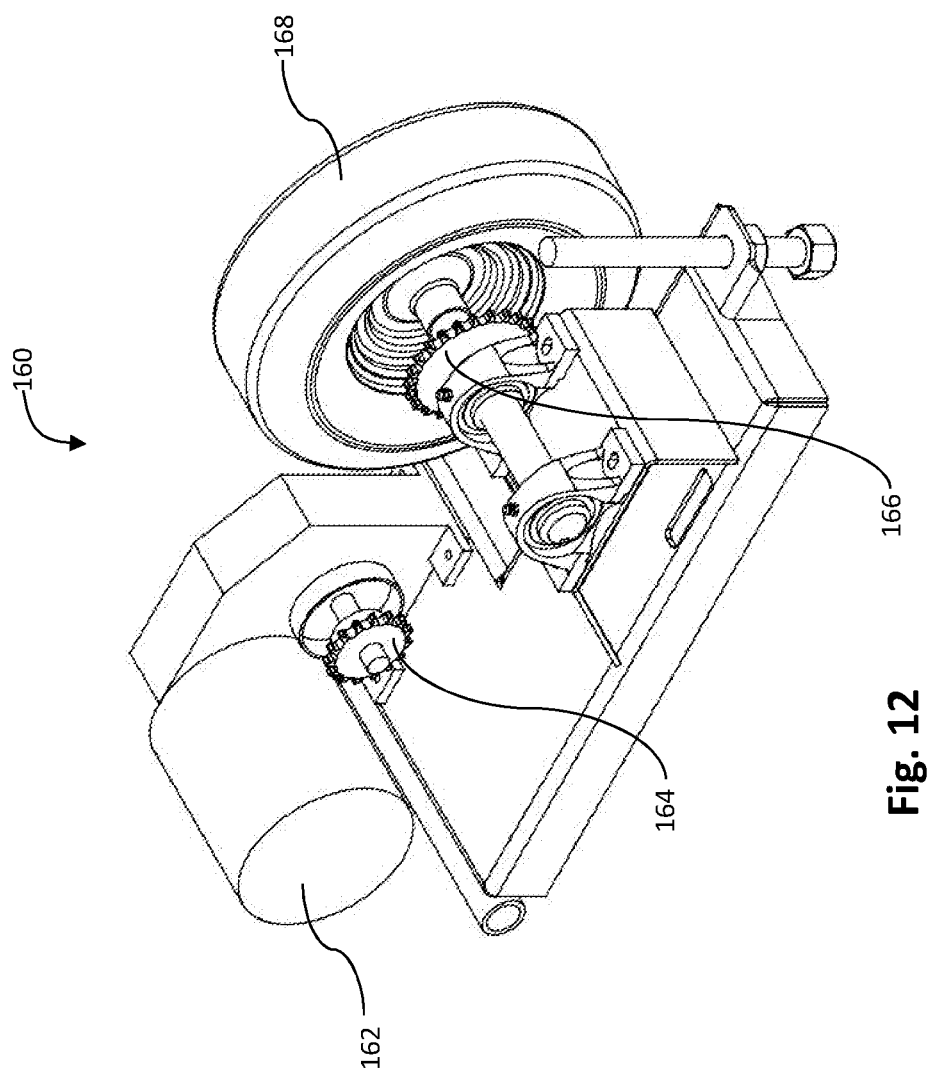
FIG. 12 is a motor-driven wheel of a system for assembling roofing.

FIG. 12 illustrates a detailed view of a motorized-wheel 160 for use with the system of assembling roofing. As roofing is hoisted into position, the system may need to move forward to allow room for the crane to lift the next assembled roofing section into place. Accordingly, a plurality of motorized-wheels 160 may be used. In one embodiment, as shown in FIG. 1, the motorized wheels 160 are coupled to, and support, center frame 102. A motor 162 drives a plurality of sprockets 164, 166 (using a chain, not shown) to actuate the tire 168.

As understood from the foregoing, the configuration of the system allows the workers to assemble a roofing section at ground level. As noted above, and as shown in the drawings, there are two assembly sides 104, 106. This increases efficiency by allowing one roof section to be assembled while another is being raised to position. As such, the second assembly side 106 is a mirror image of the first assembly side 104. However, having two assembly sides 104, 106 is not required, although it is beneficial.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A method of assembling roofing, the method comprising:
   placing a plurality of open web joists between a first joist railing of a first assembly side and a second joist railing of the first assembly side;
   placing another plurality of open web joists between a first joist railing of a second assembly side and a second joist railing of the second assembly side;
   mounting and welding one or more purlins of the plurality of open web joists on the first assembly side and second assembly side, respectively;
   placing corrugated steel sheathing on a first cantilevered gantry of a first assembly side;
   moving the first cantilevered gantry along the length of a center frame;
   removing the corrugated steel sheathing from the first cantilevered gantry as it travels on the center frame;
   securing the corrugated steel sheathing to the plurality of open web joists on the first assembly side, which forms an assembled roofing section;
   hoisting the assembled roofing section to a top of a structure for securing thereto.

2. The method of claim 1, further comprising a motor to move the first cantilevered gantry along the center frame.

* * * * *